(12) United States Patent
Yamamoto et al.

(10) Patent No.: US 8,717,739 B2
(45) Date of Patent: May 6, 2014

(54) CERAMIC ELECTRONIC COMPONENT (75) Inventors: Yoji Yamamoto, Nagaokakyo (JP);
Akihiro Motoki, Nagaokakyo (JP);
Syunsuke Takeuchi, Nagaokakyo (JP);
Makoto Ogawa, Nagaokakyo (JP);
Toshiyuki Iwanaga, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 66 days.

(21) Appl. No.: 13/419,545

(22) Filed: Mar. 14, 2012

(65) Prior Publication Data

US 2012/0236461 A1    Sep. 20, 2012

(30) Foreign Application Priority Data

Mar. 15, 2011  (JP) ................. 2011-056905
Feb. 8, 2012   (JP) ................. 2012-024978

(51) Int. Cl.
*H01G 4/005*   (2006.01)
*H01G 4/228*   (2006.01)

(52) U.S. Cl.
USPC ............... 361/306.3; 361/306.1; 361/303

(58) Field of Classification Search
USPC .................... 361/303, 306.1, 306.3
See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 7,580,240 B2 * | 8/2009 | Yamamoto et al. | 361/311 |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |
| 2009/0268374 A1 | 10/2009 | Motoki et al. | |
| 2010/0302704 A1 * | 12/2010 | Ogawa et al. | 361/306.3 |

FOREIGN PATENT DOCUMENTS

| | | |
|---|---|---|
| JP | 2007-036003 A | 2/2007 |
| JP | 2009-267146 A | 11/2009 |
| WO | 2007/049456 A1 | 5/2007 |

* cited by examiner

*Primary Examiner* — Eric Thomas
*Assistant Examiner* — Arun Ramaswamy
(74) *Attorney, Agent, or Firm* — Keating & Bennett, LLP (57) ABSTRACT

A ceramic electronic component includes a substantially rectangular ceramic element assembly, a first external electrode, and a second external electrode. The first external electrode includes at least one plating film including a first plating film disposed directly on the ceramic element assembly from outside. Likewise, the second external electrode includes at least one plating film including a second plating film disposed directly on the ceramic element assembly from outside. The first and second plating films each have a surface area per unit area equal to or larger than about 1.02 in plan view.

7 Claims, 11 Drawing Sheets

CERAMIC ELECTRONIC COMPONENT

BACKGROUND OF THE INVENTION

1. Field of the Invention

The present invention relates to ceramic electronic components, in particular, a ceramic electronic component that includes a substantially rectangular ceramic element assembly and external electrodes located on the ceramic element assembly.

2. Description of the Related Art

Various ceramic electronic components such as ceramic capacitors have been used in a wide range of electronic apparatuses. For example, WO 2007/049456 A1 provides an example of ceramic electronic components by disclosing a multilayer ceramic capacitor. This ceramic capacitor has a substantially rectangular ceramic element assembly, first and second internal electrodes formed in the ceramic element assembly, a first external electrode formed on a first end surface of the ceramic element assembly, and a second external electrode formed on a second end surface of the ceramic element assembly, and the first and second external electrodes are formed by plating.

However, this ceramic capacitor is disadvantageous in that soldering the first and second electrodes to electrodes on a circuit board often causes the plating films to detach.

SUMMARY OF THE INVENTION

Accordingly, preferred embodiments of the present invention provide a ceramic electronic component from which the plating films constituting the external electrodes are unlikely to detach.

According to a preferred embodiment of the present invention, a ceramic electronic component includes a substantially rectangular ceramic element assembly, a first external electrode, and a second external electrode. The ceramic element assembly includes three pairs of opposite surfaces including first and second principal surfaces, first and second lateral surfaces, and first and second end surfaces. The first external electrode includes one or more plating films disposed directly on the ceramic element assembly from outside, which is referred to as the at least one first plating film. Likewise, the second external electrode includes one or more plating films disposed directly on the ceramic element assembly from outside, which is referred to as the at least one second plating film. The first and second plating films each have a surface area per unit area equal to or larger than about 1.02, for example, in plan view.

It is preferable that the at least one first plating film is disposed directly on the first end surface, and the at least one second plating film is disposed directly on the second end surface.

It is also preferable that the at least one first plating film and the at least one second plating film are each disposed directly on either or both of the first and second principal surfaces.

It is further preferable that the ceramic electronic component further includes a plurality of first internal electrodes and a plurality of second internal electrodes provided in the ceramic element assembly. The first external electrode includes depressions at the positions substantially corresponding to the first internal electrodes, and the second external electrode includes depressions at the positions substantially corresponding to the second internal electrodes.

It is also preferable that each of the at least one first plating film and the at least one second plating film has a surface area per unit area equal to or smaller than about 1.15, for example, in plan view.

It is preferable that the first external electrode is a laminate including two more plating films in addition to the at least one first plating film, a third plating film disposed on the at least one first plating film, and a fifth plating film disposed on the third plating film. The fifth plating film is preferably made of Sn or a Sn alloy. Likewise, the second external electrode preferably is a laminate including two more plating films in addition to the at least one second plating film, a fourth plating film disposed on the second plating film, and a sixth plating film disposed on the fourth plating film. The sixth plating film is preferably made of Sn or a Sn alloy.

The third and fourth plating films are preferably made of Ni or a Ni alloy, and the first and second plating films are preferably made of Cu or a Cu alloy.

As described above, various preferred embodiments of the present invention provide ceramic electronic components from which the plating films constituting the external electrodes are unlikely to detach.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
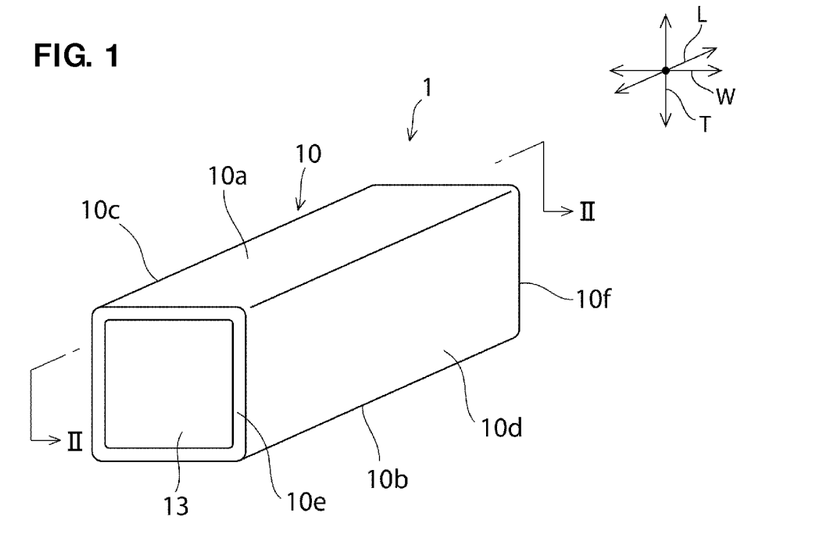
FIG. 1 is a schematic perspective view of a ceramic electronic component according to a first preferred embodiment of the present invention.

The following describes the ceramic electronic component 1 illustrated in FIG. 1 according to a first preferred embodiment of the present invention. This ceramic electronic component 1 is for illustration purposes only and is never intended to limit the ceramic electronic components according to the present invention.

Figure 2:
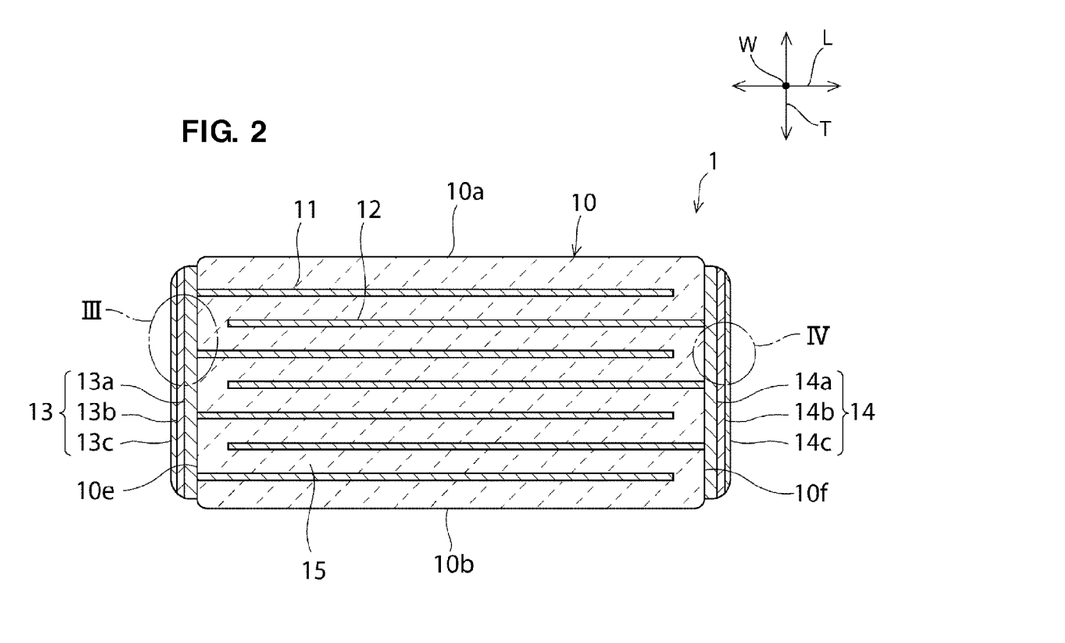
FIG. 2 is a schematic cross-sectional view taken along line II-II of FIG. 1.
Figure 3:
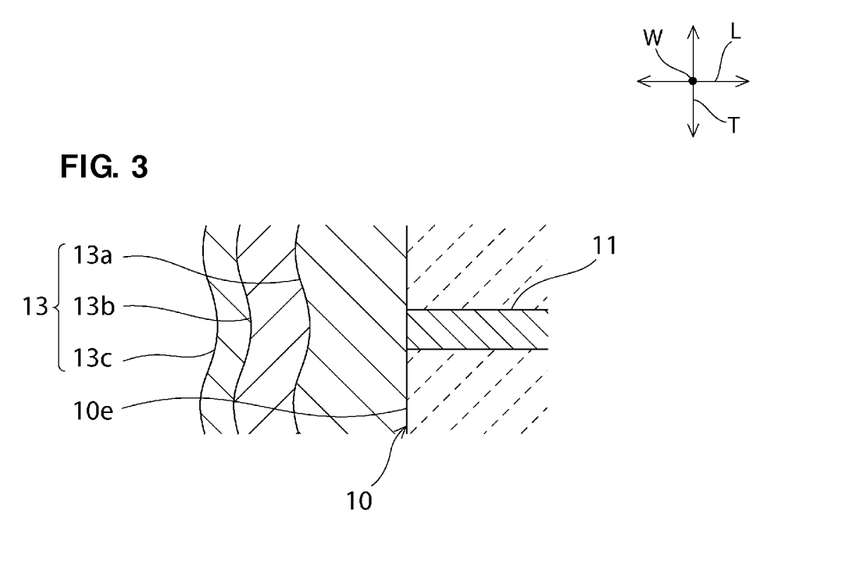
FIG. 3 is an enlarged schematic cross-sectional view of portion III of FIG. 2.
Figure 4:
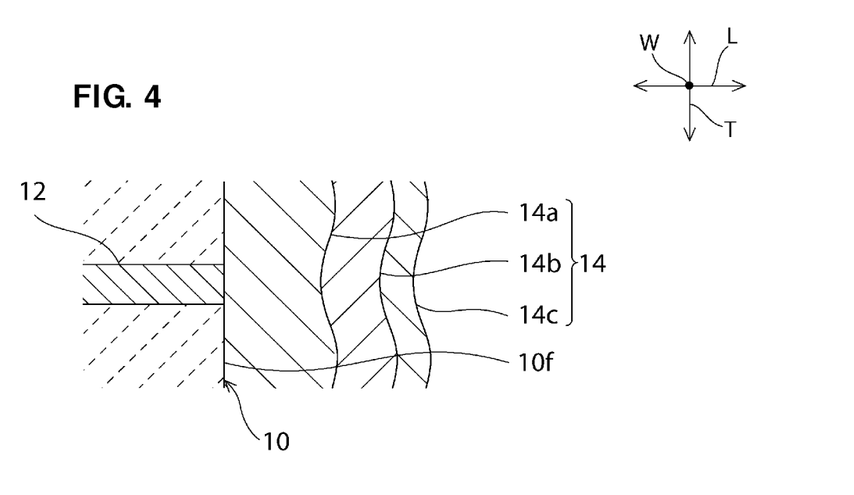
FIG. 4 is an enlarged schematic cross-sectional view of portion IV of FIG. 2.
Figure 5:
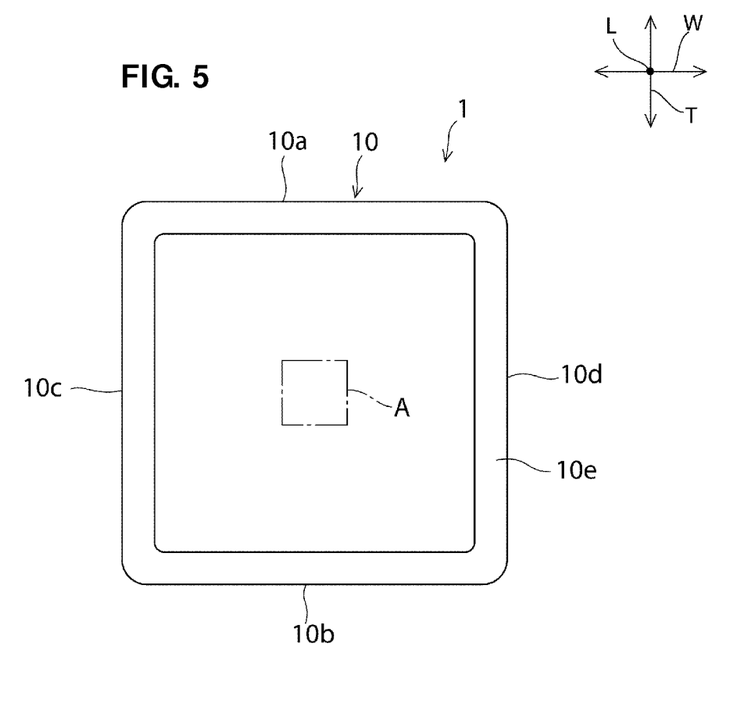
FIG. 5 is a schematic side view of the ceramic electronic component according to the first preferred embodiment of the present invention.

FIG. 1 is a schematic perspective view of a ceramic electronic component according to the present preferred embodiment. FIG. 2 is a schematic cross-sectional view taken along line II-II of FIG. 1. FIGS. 3 and 4 are enlarged schematic cross-sectional views of portions III and IV of FIG. 2, respectively. FIG. 5 is a schematic side view of the same ceramic electronic component.

As illustrated in FIGS. 1 and 2, the ceramic electronic component 1 includes a ceramic element assembly 10. The ceramic element assembly 10 has a substantially rectangular shape and includes three pairs of opposite surfaces including first and second principal surfaces 10a and 10b, first and second lateral surfaces 10c and 10d, and first and second end surfaces 10e and 10f. The first and second principal surfaces 10a and 10b each extend in the longitudinal direction L and in the width direction W. The first and second lateral surfaces 10c and 10d each extend in the longitudinal direction L and in the thickness direction T. The first and second end surfaces 10e and 10f each extend in the width direction W and in the thickness direction T. The longitudinal direction L and the width direction W are substantially perpendicular to each other, and the thickness direction T is perpendicular to the longitudinal direction L and to the width direction W.

The term substantially rectangular as used herein means that rectangular parallelepipeds having rounded or beveled corners and/or edges are also included. Therefore, the ceramic element assembly 10 may be a rectangular parallelepiped rounded at its corners and/or along its edges at least in part.

As can be seen from FIG. 2, the ceramic element assembly 10 according to the present preferred embodiment is a laminate including a plurality of ceramic layers 15 stacked in the thickness direction T. The thickness of each ceramic layer 15 is preferably in a range of about 0.5 μm to about 5 μm, for example.

The ceramic element assembly 10 is made of a suitable ceramic material. The intended characteristics of the ceramic electronic component 1 and other factors may determine suitable ceramics for the ceramic element assembly 10.

For example, when the ceramic electronic component 1 is a ceramic capacitor element, dielectric ceramics may be used as the base material of the ceramic element assembly 10. Specific examples of suitable dielectric ceramics include $BaTiO_3$, $CaTiO_3$, $SrTiO_3$, and $CaZrO_3$. The ceramic element assembly 10 may further contain other materials such as compounds based on Mn, Fe, Cr, Co, Ni, or the like.

When the ceramic electronic component 1 is a ceramic piezoelectric element, piezoelectric ceramics may be used as the base material of the ceramic element assembly 10. Specific examples of suitable piezoelectric ceramics include PZT (lead zirconate titanate) ceramics.

When the ceramic electronic component 1 is a thermistor element, semiconductor ceramics may be used to make the ceramic element assembly 10. Specific examples of suitable semiconductor ceramics include spinel ceramics.

When the ceramic electronic component 1 is an inductor element, magnetic ceramics may be used to make the ceramic element assembly 10. Specific examples of suitable magnetic ceramics include ferrite ceramics.

To provide an example of the ceramic electronic component 1 according to the present preferred embodiment, the following paragraphs describe a ceramic capacitor in which the ceramic element assembly 10 is mainly composed of a dielectric ceramic material.

The ceramic element assembly 10 includes a plurality of first internal electrodes 11 and a plurality of second internal electrodes 12. The first and second internal electrodes 11 and each extend within the ceramic element assembly 10 in the longitudinal direction T and in the width direction W. Furthermore, the first and second internal electrodes 11 and 12 are alternately arranged in the thickness direction T and partially overlap one another, putting one of the ceramic layers 15 therebetween.

The first internal electrodes 11 are substantially exposed on the first end surface 10e, but not on the second end surface 10f, the first and second principal surfaces 10a and 10b, and the first and second lateral surfaces 10c and 10d. The second internal electrodes 12 are substantially exposed on the second end surface 10f, but not on the first end surface 10e, the first and second principal surfaces 10a and 10b, and the first and second lateral surfaces 10c and 10d.

The thickness of each of the first and second internal electrodes 11 and 12 is preferably in a range of about 0.3 μm to about 2.0 μm, for example.

The first and second internal electrodes 11 and 12 can be made of any material as long as it is electroconductive. Examples of suitable materials for the first and second internal electrodes 11 and 12 include metals such as Ni, Cu, Ag, Pd, and Au, and alloys containing one or more such metals such as Ag—Pd alloys.

The ceramic element assembly 10 includes a first external electrode 13 disposed on the first end surface 10e, and this first external electrode 13 is in electrical connection with the first internal electrodes 11. Furthermore, the ceramic element assembly 10 includes a second external electrode 14 disposed on the second end surface 10f, and this second external electrode 14 is in electrical connection with the second internal electrodes 12. Although in the present preferred embodiment, the first and second external electrodes 13 and 14 extend only over the first and second end surfaces 10e and 10f, respectively, they may reach the principal surfaces 10a and 10b and/or the lateral surfaces 10c and 10d.

Furthermore, each of the first and second external electrodes 13 and 14 may be a single plating film or a laminate including two or more plating films.

In the present preferred embodiment, the first external electrode 13 preferably is a laminate including three plating films 13a to 13c, for example. The plating film 13a is disposed directly on the first end surface 10e. The plating film 13b is disposed on the plating film 13a, and the plating film 13c is disposed on the plating film 13b. However, the plating film 13a alone can also serve as the first external electrode 13.

Likewise, the second external electrode 14 preferably is a laminate including three plating films 14a to 14c. The plating film 14a is disposed directly on the second end surface 10f, the plating film 14b is disposed on the plating film 14a, and the plating film 14c is disposed on the plating film 14b. The plating film 14a alone can also serve as the first external electrode 14.

The plating films 13a and 14a may be made of Cu, a Cu alloy, or any other similar material. In one example of the present preferred embodiment, the first and second internal electrodes 11 and 12 are preferably made of Ni or a Ni alloy, and the plating films 13a and 14a are preferably made of Cu or a Cu alloy. This provides an improved bond between the first internal electrodes 11 and the plating film 13a, and between the second internal electrodes 12 and the plating film 14a.

The plating films 13a and 14a can have any thickness. For example, the thickness of plating films 13a and 14a may be in a range of about 2.5 μm to about 10 μm, for example.

The plating film 13b works to improve the adhesion between solder and the first external electrode 13, and the plating film 14b works to improve the adhesion between solder and the second external electrode 14. For this purpose, it is preferred that the plating films 13b and 14b are highly compatible with solder and also with the plating films 13a and 14a. Examples of suitable materials for the plating films 13b and 14b include Ni and Ni alloys.

The plating films 13b and 14b can have any thickness. For example, their preferred thickness is in a range of about 1 μm to about 5 μm. With any thickness larger than about 5 μm, the plating films 13b and 14b fill the depressions on the plating films 13a and 14a and thereby may lessen the advantages of various preferred embodiments of the present invention.

The plating films 13c and 14c in this preferred embodiment are preferably made of Sn or a Sn alloy. When the first and second external electrodes 13 and 14 are soldered, these plating films 13c and 14c are substantially dissolved in and fused with solder, and the plating films 13b and 14b are substantially joined to solder.

The plating films 13c and 14c can have any thickness. For example, the thickness of the plating films 13c and 14c may be in a range of about 1 μm to about 10 μm, for example.

The plating films 13a and 14a, which are disposed directly on the first and second end surfaces 10e and 10f, respectively, each have a surface area per unit area in plan view (hereinafter sometimes referred to as an S ratio) equal to or larger than about 1.02, for example. This provides an improved bond between the plating films 13a and 13b and between the plating films 14a and 14b and thereby makes the first and second external electrodes 13 and 14 free from the detachment of the plating films 13b and 14b as also demonstrated by the experiments described later. Furthermore, S ratios in a range of about 1.02 to about 1.15, for example, can not only improve the bond between the plating films 13a and 13b and between the plating films 14a and 14b but also increase the solder wettability of the first and second external electrodes 13 and 14.

Too small S ratios of the plating films 13a and 14a may cause the plating films 13b and 14b to detach easily, probably because of the accordingly reduced contact areas between the plating films 13a and 13b and between the plating films 14a and 14b.

On the other hand, too large S ratios of the plating films 13a and 14a may make the first and second external electrodes 13 and 14 insufficiently solder-wettable, probably because of the accordingly increased surface unevenness of the first and second external electrodes 13 and 14.

As mentioned above, the outermost plating films, which are the plating films 13c and 14c in this preferred embodiment, are substantially dissolved in solder during the process of solder implementation. In other words, the first and second external electrodes 13 and 14 are substantially joined to solder on the surface of the plating films 13b and 14b, respectively. This means that the direct determinant of the solder-wettability of the external electrodes 13 and 14 is the S ratios of the plating films 13b and 14b. When the plating films 13b and 14b have a thickness equal to or smaller than about 5 μm, the S ratios of the plating films 13b and 14b are substantially equal to those of the plating films 13a and 14a, respectively, because the plating films 13a and 14a are thin. Thus, controlling the S ratios of the plating films 13b and 14b in a preferred range leads to a favorable solder-wettability of the external electrodes 13 and 14.

A non-limiting example of a method for determining the S ratios as used herein is as follows.

First, the plating films 13a and 14a are exposed. For example, when the plating films 13b, 13c, 14b, and 14c are present, the plating films 13a and 14a can be exposed by removing the plating films 13b, 13c, 14b, and 14c. In a possible constitution in which the plating films 13b and 14b are made of Ni and the plating films 13c and 14c are made of Sn, the plating films 13b, 13c, 14b, and 14c can be removed by immersing the ceramic electronic component 1 in an aqueous solution of 50 mL of distilled water, 50 mL of 89% ethanol, 50 mL of 32% hydrochloric acid, and 10 g of copper sulfate (II), for example.

Then, a scanning probe microscope is used to measure the surface area of a 50 μm by 50 μm square (region A in FIG. 5) in the middle of the plating film 13c. More specifically, the 50 μm by 50 μm square is scanned at 256×256 points inside, straight lines are drawn through the points to make 255×255 quadrilaterals, and then the total area of these 255×255 quadrilaterals is calculated. The calculated total area is the surface area of the plating film 13c in the 50 μm by 50 μm square. This surface area is then divided by 2500 μm$^2$, the area of the square. The obtained result is the S ratio of the plating film 13a. The S ratio of the plating film 14a can also be determined in the same way. The reason for measuring the surface area of the plating film 13c only in a square in the middle (region A in FIG. 5) is that the plating film 13c has a uniform surface profile and thus the S ratio determined in the region A alone can represent the overall S ratio.

The ceramic electronic component 1 according to this preferred embodiment can be fabricated by any process. A possible fabrication process of the ceramic electronic component 1 is as follows.

First, ceramic green sheets as the material of the ceramic element assembly 10 are prepared. Ceramic green sheets can be produced by screen printing and other various printing processes as well as other similar methods.

Then, electroconductive paste is printed on one of the ceramic green sheets by screen printing or any other appropriate printing process to form an internal-electrode pattern. The paste printed to form the internal-electrode pattern may contain an organic binder, an organic solvent, and other ingredients in addition to conductive fine particles.

To form outer layers, some other ceramic green sheets, which have no internal-electrode pattern, are stacked to form an initial stack. The ceramic green sheet having the internal-electrode pattern is stacked on the initial stack. Then, another set of ceramic green sheets having no internal-electrode pattern are stacked on the initial stack to form a mother laminate. The mother laminate may be compressed in the stacking direction by isostatic pressing or any other appropriate method.

A raw ceramic laminate is then cut out of the mother laminate. This raw ceramic laminate may be processed by barreling or any other appropriate polishing method to have beveled or rounded corners and/or edges.

The raw ceramic laminate is then fired to provide a ceramic element assembly. The firing temperature may be appropriately chosen depending on the composition of the ceramic laminate and other factors; for example, it may be in a range of about 900° C. to about 1300° C.

Then, the ceramic element assembly is plated several times to have a first external electrode 13 preferably including plating films 13a to 13c and a second external electrode 14 preferably including plating films 14a to 14c formed thereon. In this way, the ceramic electronic component 1 is completed.

The plating films 13a to 13c and 14a to 14c may be formed by electrolytic plating or non-electrolytic plating, for example. If necessary, the formed plating films may be subjected to treatment such as heating.

In this preferred embodiment, the plating films 13a and 14a are heated to make the plating film 13a and each internal electrode 11 diffuse in each other and become alloyed and to make the plating film 14a and each internal electrode 12 diffuse in each other and become alloyed. Once the interdiffusion of metal between the plating film 13a and the internal electrodes 11 and that between the plating film 14a and the internal electrodes 12 are achieved, the plating films 13a and 14a obtain an uneven surface profile with depressions pointing the ceramic element assembly 10 formed at the internal electrodes 11 and 12, respectively. More specifically, alloying the plating films 13a and 14a with the internal electrodes 11 and 12, respectively, makes metal in the plating films 13a and 14a diffuse out into the internal electrodes 11 and 12, respectively, and thereby the surface of the plating films 13a and 14a is pressed down toward the ceramic element assembly 10 at the positions substantially corresponding to the internal electrodes 11 and 12, respectively. For example, when the plating films 13a and 14a contain Cu and the internal electrodes 11 and 12 contain Ni, Cu in the plating films 13a and 14a has a higher diffusion coefficient than Ni in the internal electrodes 11 and 12 and thus is energetically unstable. The energetically unstable Cu particles favor a more stable location and thus move toward the Ni particles in the internal electrodes 11 and 12, which have a lower diffusion coefficient. As a result, the uneven surface described above is formed.

In this fabrication process, the S ratios of the plating films 13a and 14a are determined by factors such as the heating conditions, the thickness, and the growth rate of the plating films 13a and 14a. For example, when the plating films 13a and 14a are formed with a smaller thickness and then heated at a higher temperature and for a longer period of time, higher S ratios are obtained. On the other hand, when the plating films 13a and 14a are formed with a larger thickness and then heated at a lower temperature and for a shorter period of time, lower S ratios are obtained.

In addition, the higher S ratios obtained by heating the plating films 13a and 14a at a higher temperature and for a longer period of time are probably because these conditions help the plating films 13a and 14a to be alloyed with the internal electrodes 11 and 12, respectively, and the S ratios of the end surfaces 10e and 10f are accordingly increased.

The following describes some other preferred embodiments of the present invention. In the following, the members having substantially the same functions as those described in first preferred embodiment are denoted by the same reference numerals as in the first preferred embodiment with no further explanation.

Second and Third Preferred Embodiments

Figure 6:
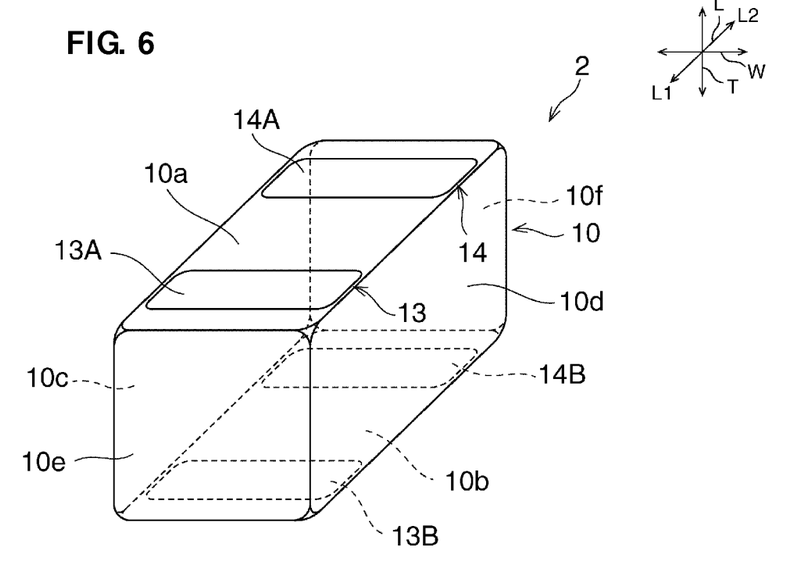
FIG. 6 is a schematic perspective view of a ceramic electronic component according to a second preferred embodiment of the present invention.
Figure 7:
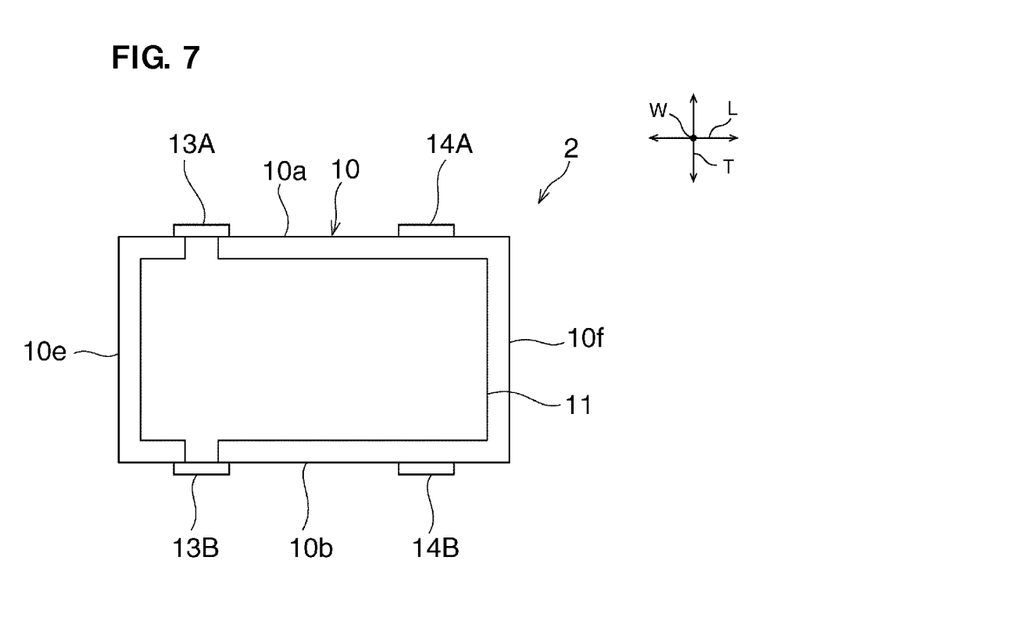
FIG. 7 is a schematic cross-sectional view of the ceramic electronic component according to the second preferred embodiment of the present invention.
Figure 8:
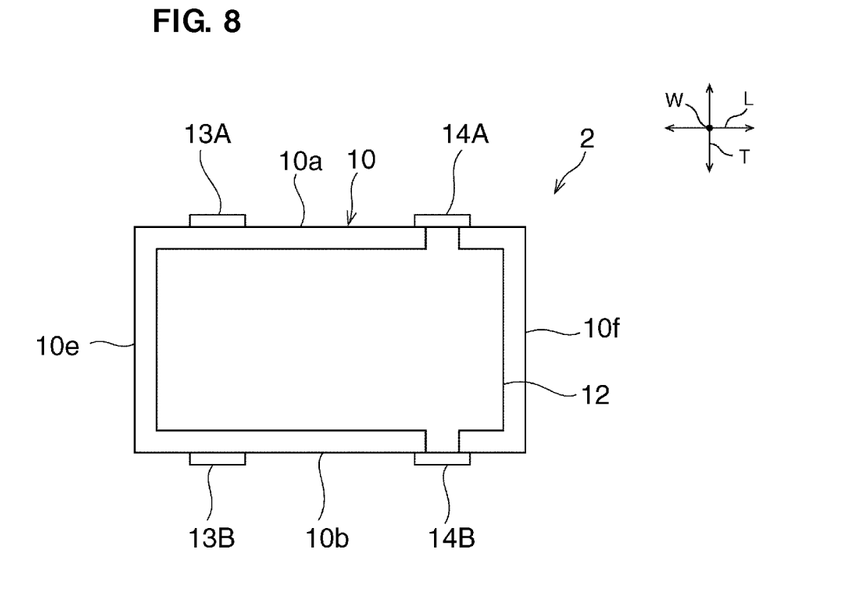
FIG. 8 is another schematic cross-sectional view of the ceramic electronic component according to the second preferred embodiment of the present invention.
Figure 9:
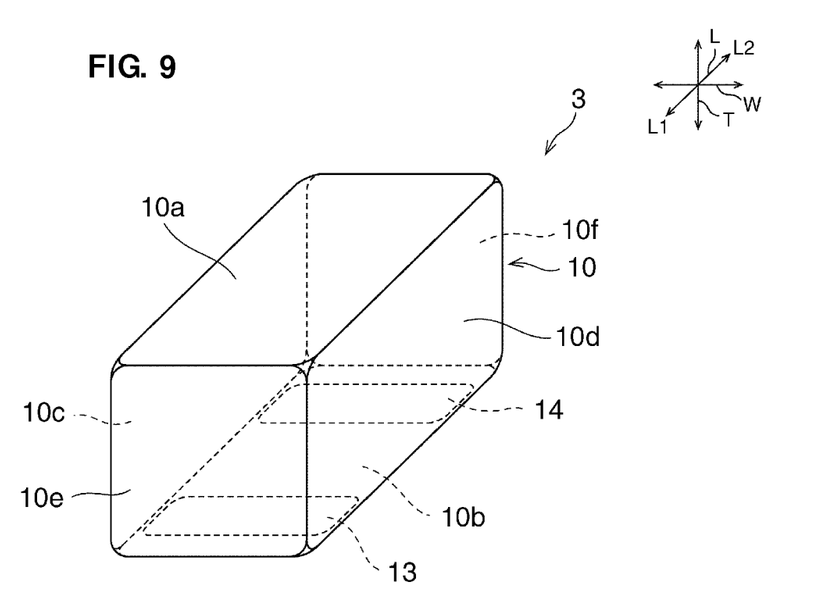
FIG. 9 is a schematic perspective view of a ceramic electronic component according to a third preferred embodiment of the present invention.
Figure 10:
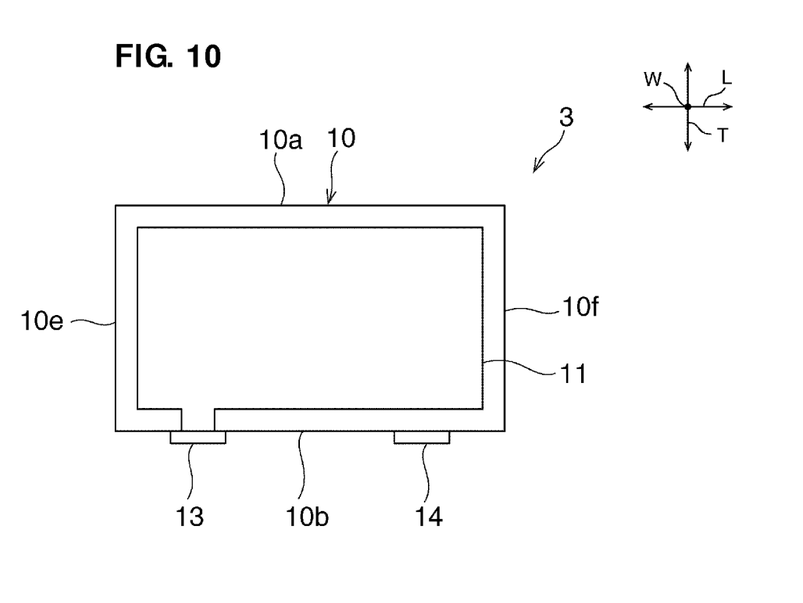
FIG. 10 is a schematic cross-sectional view of the ceramic electronic component according to third preferred embodiment of the present invention.
Figure 11:
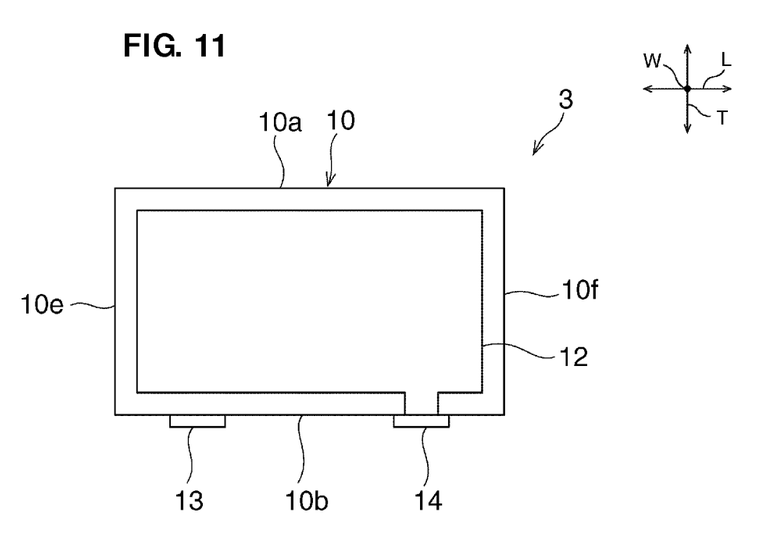
FIG. 11 is another schematic cross-sectional view of the ceramic electronic component according to a third preferred embodiment of the present invention.

FIG. 6 is a schematic perspective view of a ceramic electronic component according to a second preferred embodiment. FIGS. 7 and 8 are schematic cross-sectional views of the same ceramic electronic component. FIG. 9 is a schematic perspective view of a ceramic electronic component according to a third preferred embodiment. FIGS. 10 and 11 are schematic cross-sectional views of the same ceramic electronic component.

The ceramic electronic component 2 according to the second preferred embodiment and the ceramic electronic component according to the third preferred embodiment preferably have substantially the same constitution as the ceramic electronic component 1 according to the first preferred embodiment except for the first and second internal electrodes 11 and 12 and the first and second external electrodes 13 and 14.

As illustrated in FIGS. 6 to 8, the ceramic electronic component 2 is different from that of the first preferred embodiment in that the first external electrode 13 includes a first electrode portion 13A located on the first principal surface 10a and a second electrode portion 13B located on the second principal surface 10b and that the second external electrode 14 has a first electrode portion 14A located on the first principal surface 10a and a second electrode portion 14B formed on the second principal surface 10b. The first and second electrode portions 13A and 13B are arranged on the L1 side in the longitudinal direction L, whereas the first and second electrode portions 14A and 14B on the L2 side.

On the other hand, the ceramic electronic component 3 is different from that of the first preferred embodiment in that the first and second external electrodes 13 and 14 are provided on the second principal surface 10b as illustrated in FIGS. 9 to 11.

In both the second and third preferred embodiments, the first internal electrodes 11 and the second internal electrodes 12 each preferably extend in the longitudinal direction L and in the thickness direction T, and are alternately arranged in the width direction W.

Furthermore, as in the first preferred embodiment above, the first and second external electrodes 13 and 14 are laminates preferably including three plating films 13a to 13c and three plating films 14a to 14c, respectively, and the first and second plating films 13a and 14a each preferably have a surface area per unit area in plan view (an S ratio) equal to or larger than about 1.02, for example. As a result, similar to the first preferred embodiment, the second and third preferred embodiments prevent the plating films 13a and 14a from detaching. Furthermore, controlling the S ratios of the first and second plating films 13a and 14a in a range of about 1.02 to about 1.15, for example, leads to excellent solder wettability of the first and second external electrodes 13 and 14, respectively. The S ratios can be measured in the same way as in the first preferred embodiment, using a 50 μm by 50 μm square in the middle of the plating films 13c and 14c.

The following provides further details of various preferred embodiments of the present invention with reference to specific non-limiting experiments.

Experiments

Ceramic capacitors having substantially the same constitution as the ceramic electronic component 1 according to the first preferred embodiment were prepared by the fabrication process described in the first preferred embodiment under the following conditions. In each of Experiments 1 to 6, 200 samples having the S ratio specified in the Table were chosen for testing. In the Table, the S ratio of Experiment 1 is to specify the value after rounding the measurement to three decimal places, and those of Examples 2 to 6 are to specify the value after rounding the measurement to two decimal places.

Dimensions of each ceramic capacitor: 1.0 mm (length)×0.5 mm (width)×0.5 mm (height)
Material of the ceramic element assembly: A dielectric ceramic material based on barium titanate
Base material of the internal electrodes: Ni
Thickness of each internal electrode: 0.5 μm
Total number of the internal electrodes: 230 layers
Thickness of each ceramic layer: 1.1 μm
Rated voltage: 6.3 V
Capacitance: 2.2 μF
Plating films 13a and 14a: Cu-based plating films Thickness of the plating films 13a and 14a: 6.5 μm
Plating bath used to form the plating films 13a and 14a: Pyrobrite process, manufactured by C. Uemura & Co., Ltd. (pH 8.8, 55° C.)
Heating conditions:
  Experiment 1: No heat treatment performed
  Experiment 2: 700° C. for 20 minutes
  Experiment 3: 700° C. for 60 minutes
  Experiment 4: 700° C. for 120 minutes
  Experiment 5: 700° C. for 180 minutes
  Experiment 6: 700° C. for 240 minutes
Plating films 13b and 14b: Ni-based plating films
Thickness of the plating films 13b and 14b: About 4 μm
Plating bath used to form the plating films 13b and 14b: Watts bath (a weakly acidic single-component Ni bath; pH 4.2, 60° C.)
Plating films 13c and 14c: Sn-based plating films
Thickness of the plating films 13c and 14c: About 4 μm
Plating bath used to form the plating films 13c and 14c: Sn-235, manufactured by Dipsol Chemicals Co., Ltd. (pH 5.0, 33° C.)
Processing conditions of the plating films 13a to 13c and 14a to 14c:
  Process: Horizontal rotating barrel process
  Rotational speed: 12 rpm
  Diameter of the electroconductive medium: 0.4 mm
  Current density×time for the formation of the plating films 13a and 14a: 0.5 A/dm$^2$×70 minutes
  Current density×time for the formation of the plating films 13b and 14b: 0.4 A/dm$^2$×60 minutes
  Current density×time for the formation of the plating films 13c and 14c: 0.1 A/dm$^2$×60 minutes The ceramic capacitors fabricated in Experiments 1 to 6 were subjected to the measurement of the S ratios of the plating films 13a and 14a described in the first preferred embodiment. Results are shown in the Table below.

One hundred (100) of the ceramic capacitors fabricated in each of Experiments 1 to 6 were allowed to stand in an atmosphere of 105° C. and 100% Rh for 4 hours. The ceramic capacitors were then soldered to a glass-epoxy substrate and subjected to a bond strength test, in which a jig was used to laterally compress the ceramic capacitors at a rate of 0.7 mm/sec, the pressure was increased to 5 N, and then each ceramic capacitor was inspected for any detachment between the plating films 13a and 13b and between the plating films 14a and 14b. Ceramic capacitors with no detachment were judged to be conforming samples and the others non-conforming (NG) samples, and the number of NG samples per 100 samples was determined for each experiment. Results are shown in the Table below.

The remaining 100 of the ceramic capacitors fabricated in each of Experiments 1 to 6 were allowed to stand in an atmosphere of 105° C. and 100% Rh for 4 hours and then subjected to a solder-wettability test of the external electrodes. More specifically, SAT-5100 solder checker for general purposes, manufactured by Rhesca Corporation, was used to measure the wetting start time ($T_0$), the wetting finish time ($T_1$), and the maximum wetting force ($F_{max}$) of each ceramic capacitor, and the ceramic capacitors were assessed by whether or not the following acceptance criteria were satisfied:

$T_0+T_1 \leq 1.0$ second;

$F_{max} \geq 0.25$ mN.

Ceramic capacitors that met both criteria were judged to be conforming samples and the others non-conforming (NG) samples, and the number of NG samples per 100 samples was determined for each experiment. Results are shown in the Table.

TABLE

| Experiment | S ratio | Bond strength test (NG samples/all samples) | Solder-wettability test (NG samples/all samples) |
|---|---|---|---|
| 1 | 1.003 | 43/100 | 0/100 |
| 2 | 1.02 | 0/100 | 0/100 |
| 3 | 1.06 | 0/100 | 0/100 |
| 4 | 1.15 | 0/100 | 0/100 |
| 5 | 1.24 | 0/100 | 10/100 |
| 6 | 1.37 | 0/100 | 21/100 |

As can be seen from the Table, S ratios of the plating films 13a and 14a equal to or higher than about 1.02 resulted in effective prevention of the detachment of the plating films 13b and 14b. Furthermore, S ratios of the plating films 13a and 14a falling within a range of about 1.02 to about 1.15, for example, led to improved solder-wettability.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
   a substantially rectangular ceramic element assembly including first and second principle surfaces opposite to each other, first and second lateral surfaces opposite to each other, and first and second end surfaces opposite to each other;
   a first external electrode including a first plating film disposed directly on the ceramic element assembly; and
   a second external electrode including a second plating film disposed directly on the ceramic element assembly; wherein
   the first plating film has a surface area per unit area in a range of about 1.02 to about 1.15 in plan view; and
   the second plating film has a surface area per unit area equal to or larger than about 1.02 in plan view.

2. The ceramic electronic component according to claim 1, wherein the first plating film is disposed directly on the first end surface, and the second plating film is disposed directly on the second end surface.

3. The ceramic electronic component according to claim 1, wherein the first and second plating films are each disposed directly on either or both of the first and second principal surfaces.

4. The ceramic electronic component according to claim 1, further comprising a plurality of first internal electrodes and a plurality of second internal electrodes provided in the ceramic element assembly, wherein the first external electrode includes depressions at positions substantially corresponding to the first internal electrodes, and the second external electrode includes depressions at positions substantially corresponding to the second internal electrodes.

5. The ceramic electronic component according to claim 1, wherein the second plating film has a surface area per unit area equal to or smaller than about 1.15 in plan view.

6. The ceramic electronic component according to claim 1, wherein:
   the first external electrode is a laminate including the first plating film, a third plating film disposed on the first plating film, and a fifth plating film disposed on the third plating film, the fifth plating film being made of Sn or a Sn alloy; and the second external electrode is a laminate including the second plating film, a fourth plating film disposed on the second plating film, and a sixth plating film disposed on the fourth plating film, the sixth plating film being made of Sn or a Sn alloy.

7. The ceramic electronic component according to claim 6, wherein the third and fourth plating films are made of Ni or a Ni alloy, and the first and second plating films are made of Cu or a Cu alloy.

\* \* \* \* \*